(12) United States Patent
Lee et al.

(10) Patent No.: US 8,165,622 B2
(45) Date of Patent: Apr. 24, 2012

(54) METHOD AND APPARATUS FOR SETTING TELEPHONY MODE OF MOBILE TERMINAL

(75) Inventors: Moon-sang Lee, Suwon-si (KR); Jin Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 647 days.

(21) Appl. No.: 12/243,239

(22) Filed: Oct. 1, 2008

(65) Prior Publication Data

US 2009/0291706 A1 Nov. 26, 2009

(30) Foreign Application Priority Data

May 23, 2008 (KR) .......................... 10-2008-0048067

(51) Int. Cl.
*H04M 1/00* (2006.01)
(52) U.S. Cl. .................. 455/550.1; 455/127.4; 455/566; 455/418

(58) Field of Classification Search ................ 455/550.1, 455/127.4, 566
See application file for complete search history.

(56) References Cited

U.S. PATENT DOCUMENTS

| 7,551,945 | B2 * | 6/2009 | Okada et al. | 455/566 |
| 2007/0026901 | A1 * | 2/2007 | McKay | 455/566 |
| 2009/0197635 | A1 * | 8/2009 | Kim et al. | 455/550.1 |

FOREIGN PATENT DOCUMENTS

KR 20060112092 A * 10/2006

* cited by examiner

*Primary Examiner* — Ajit Patel
*Assistant Examiner* — Erica Navar
(74) *Attorney, Agent, or Firm* — Staas & Halsey LLP

(57) ABSTRACT

A method and an apparatus to set a telephony mode of a mobile terminal in which an audio call mode and a video call mode are automatically set using gyroscope characteristics and a user's behavior characteristics, the method including: detecting a direction of motion of the mobile terminal when there is an incoming call event; and setting the telephony mode to an audio call mode or a vide call mode according to the detected direction of the motion.

6 Claims, 6 Drawing Sheets

METHOD AND APPARATUS FOR SETTING TELEPHONY MODE OF MOBILE TERMINAL

CROSS-REFERENCE TO RELATED APPLICATIONS

This application claims the benefit of Korean Patent Application No. 2008-48067, filed on May 23, 2008, in the Korean Intellectual Property Office, the disclosure of which is incorporated herein by reference.

BACKGROUND OF THE INVENTION

1. Field of the Invention

Aspects of the present invention relate to a mobile terminal with audio and/or video call operations, and more particularly, to a method and an apparatus to set a telephony mode of a mobile terminal in which an audio call mode and a video call mode are set based on motion of the terminal and a user's behavior characteristics.

2. Description of the Related Art

Generally, mobile terminals have operations for making phone calls, playing video files, playing audio files, etc. Recently, mobile terminals, which had only been provided an audio call mode, are now being provided with a video call mode due to rapid progress in telecommunications. Accordingly, when incoming calls are received, an audio call operation or a video call operation is selected in the mobile terminal. That is, when an incoming call is received, a user can select whether the user receives the incoming call in an audio call mode or in a video call mode using a button.

However, it is inconvenient for the user to decide whether to receive the incoming call in an audio call mode or in a video call mode and select the call mode when the user receives incoming calls using a mobile phone.

SUMMARY OF THE INVENTION

Aspects of the present invention provide a method and an apparatus to set a telephony mode of a mobile terminal with audio and/or video call operations in which an audio call mode and a video call mode are set based on a motion of the mobile terminal and a user's behavior characteristics.

According to an aspect of the present invention, there is provided a method of setting a telephony mode of a mobile terminal, the method including: detecting a direction of motion of the mobile terminal when there is an incoming call event; and setting the telephony mode to an audio call mode or a video call mode according to the detected direction of the motion.

According to another aspect of the present invention, there is provided a method of setting a telephony mode of a mobile terminal, the method including: detecting motion of the mobile terminal and a user's act to initiate a call when there is an incoming call event; and setting the telephony mode to an audio call mode or a video call mode according to an order between the detected motion of the mobile terminal and the user's act to initiate the call.

According to yet another aspect of the present invention, there is provided a method of setting a telephony mode of a mobile terminal, the method including: setting a first audio or video call mode according to a direction of motion of a mobile terminal, and setting a second audio or video call mode according to an order between the motion of the mobile terminal and a user's act to initiate the call; respectively setting weights of the first audio or video call mode and the second audio r video call mode; and setting a final audio or video call mode by respectively applying weights to the first audio or video call mode and the second audio or video call mode.

According to still another aspect of the present invention, there is provided a mobile terminal including: an input unit via which a user's act to initiate a call is input; a motion sensor to detect a direction and magnitude of motion of the mobile terminal; and a controller to set a telephony mode to an audio call mode or a video call mode based on the motion detected by the motion sensor and the user's act to initiate the call input via the input unit when there is an incoming call event.

According to another aspect of the present invention, there is provided a mobile terminal including: a motion sensor to detect a direction of motion of the mobile terminal during an incoming call event; and a controller to set a telephony mode to an audio call mode or a video call mode based on the direction of the motion detected by the motion sensor.

According to another aspect of the present invention, there is provided a method of setting a telephony mode of a mobile terminal, the method including: detecting a direction of motion of the mobile terminal during an incoming call event; and setting the telephony mode to a call mode according to the detected direction of the motion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
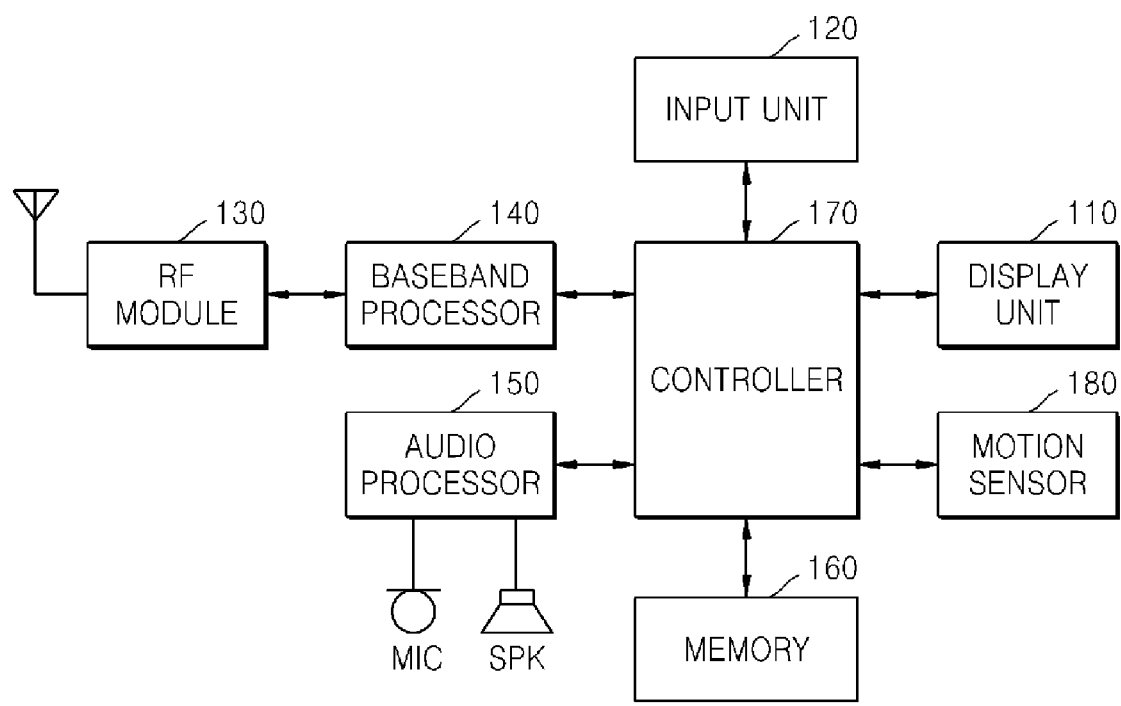
FIG. 1 is a block diagram of a mobile terminal in which a telephony mode is set according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a mobile terminal in which a telephony mode is set according to an embodiment of the present invention. Referring to FIG. 1, the mobile terminal includes a display unit 110, an input unit 120, a radio frequency (RF) module unit 130, a baseband processor 140, an audio processor 150, a memory 160, a controller 170, and a motion sensor 180.

The display unit 110 displays a variety of information received by the controller 220. As an example, the display unit 110 may be a liquid crystal display (LCD), a thin film transistor (TFT), an organic electroluminescence display (OLED), etc.

The input unit 120 receives information inputs and operation selections using a plurality of numeral and/or character buttons and at least one operational button. In particular, a call may be initiated by pressing a button of the input unit 120. The input unit 120 may include a touch screen, a rotating dial, and/or a voice recognition device.

The RF module unit 130 exchanges RF signals with a base station via an antenna, converts the received RF signals to intermediate frequency (IF) signals, and converts the IF signals received from the baseband processor 140 to RF signals. The baseband processor 140 converts baseband digital signals received from the controller 170 to analog IF signals, and converts analog IF signals received from the RF module 140 to baseband digital signals.

The audio processor 150 is connected to a microphone MIC and a speaker SPK. The audio processor encodes audio signals received from the microphone MIC, transmits the signals to the controller 170 and converts audio data received from the controller 170 to audible sound through the speaker SPK.

The memory 160 may include a read only memory (ROM), random access memory (RAM), an audio memory, etc., in order to store a programs and/or data.

The motion sensor 180 may include a variety of sensors. Furthermore, according to aspects of the present invention, the motion sensor 180 may be an acceleration sensor and/or a direction sensor (or gyroscope). The motion sensor 180 detects motion of the mobile terminal and transmits information on the motion to the controller 170. In this regard, the information on the motion may include the direction and the magnitude of the motion. The direction of the motion may be represented by leftward, rightward, forward, and backward directions based on the center of the mobile terminal. Furthermore, the magnitude of the motion may be represented by a value representing length. The motion sensor 180 transmits information on the direction and magnitude of the motion of the mobile terminal to the controller 170.

The controller 170 controls operations of the mobile terminal such as calling and data exchange. In particular, the controller 170 may set the telephony mode to an audio call mode or a video call mode according to a direction of motion detected by the motion sensor 180 if there is an incoming call. Alternatively, the controller 170 may set the telephony mode to an audio call mode or a video call mode according to an order between motion of the mobile terminal detected by the motion sensor 180 and an act of pressing a button via the input unit 120 if there is an incoming call. Alternatively, the controller 170 may set the final telephony mode using a hybrid method that combines a first call mode that sets the telephony mode to an audio call mode or a video call mode according to the direction of motion of the mobile terminal with a second call mode that sets the telephony mode to an audio call mode or a video call mode according to the order between motion of the mobile terminal and an act of pressing the button via the input unit 120.

Figure 2:
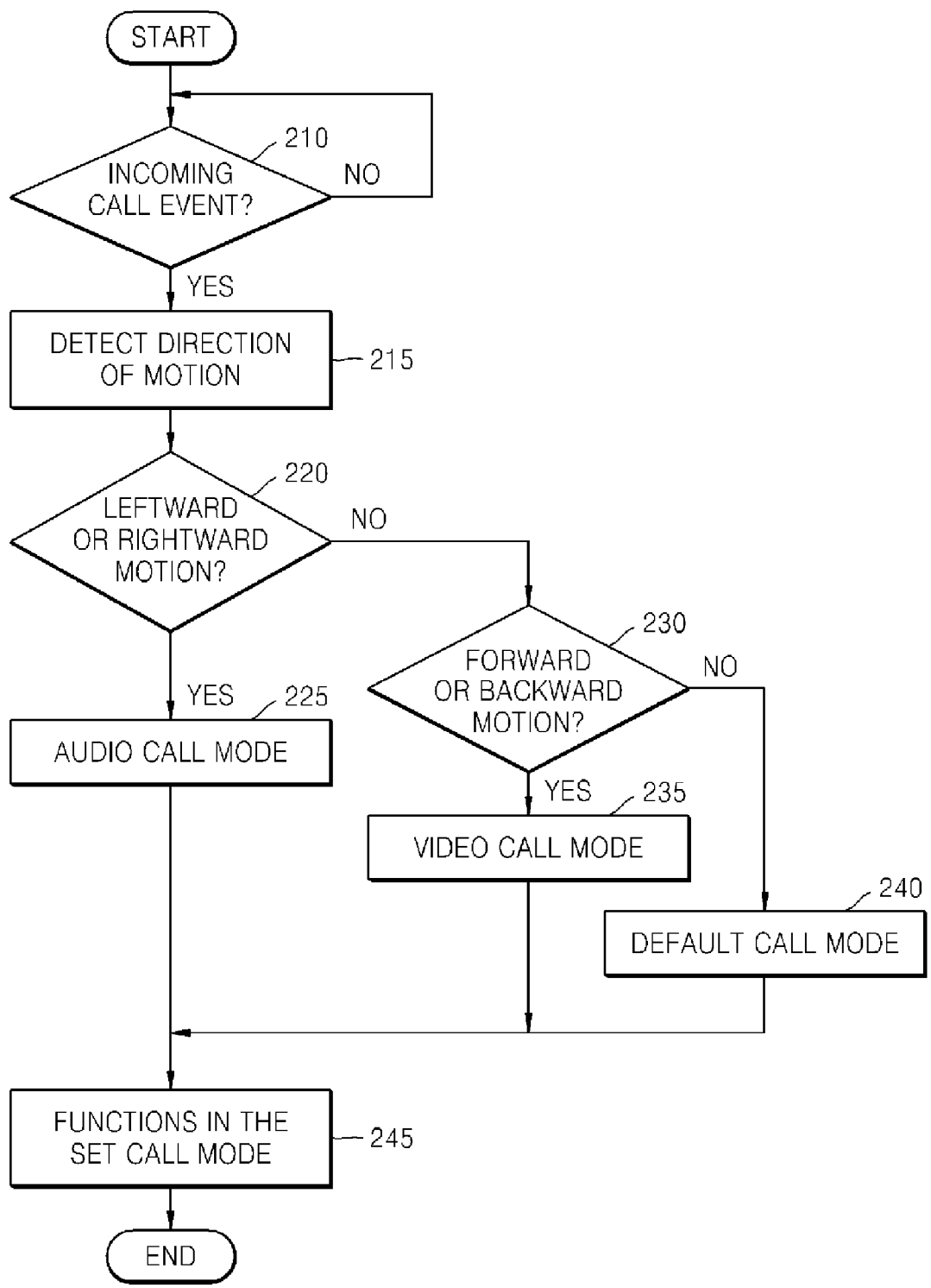
FIG. 2 is a flowchart illustrating a method of setting a telephony mode of a mobile terminal according to an embodiment of the present invention.

FIG. 2 is a flowchart illustrating a method of setting a telephony mode of a mobile terminal according to an embodiment of the present invention. Referring to FIG. 2, it is determined whether there is an incoming call event in operation 210. If there is an incoming call event (operation 210), a direction of motion of a mobile terminal is detected using a motion sensor in operation 215. That is, if there is an incoming call event, the direction of the motion of the mobile terminal is determined among, for example, leftward, rightward, forward, and backward directions by measuring an acceleration of the mobile terminal when the motion of the mobile terminal is stopped. Then, a telephony mode is set using the detected direction of the motion of the mobile terminal.

Figure 3A:
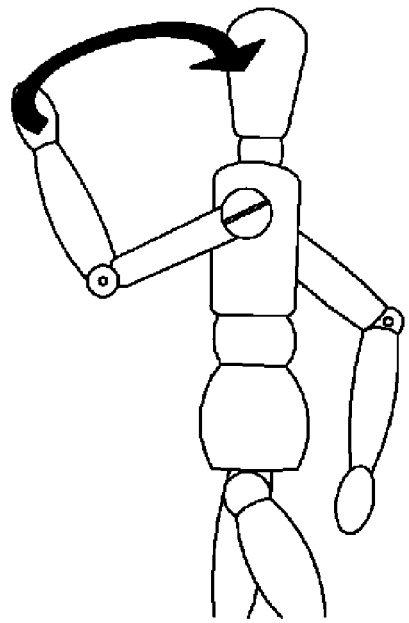
FIGS. 3A to 3C show directions of motion of a mobile terminal according to user's behavior characteristics.
Figure 3B:
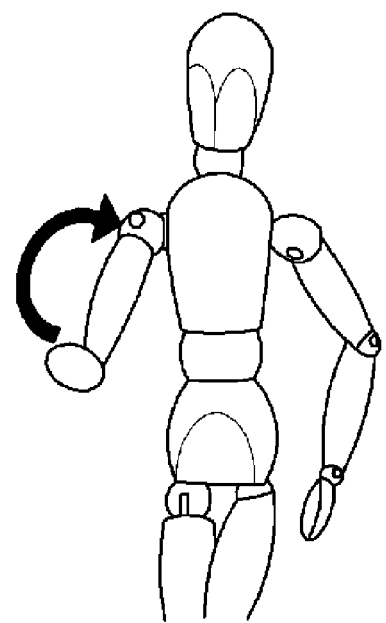
Figure 3C:
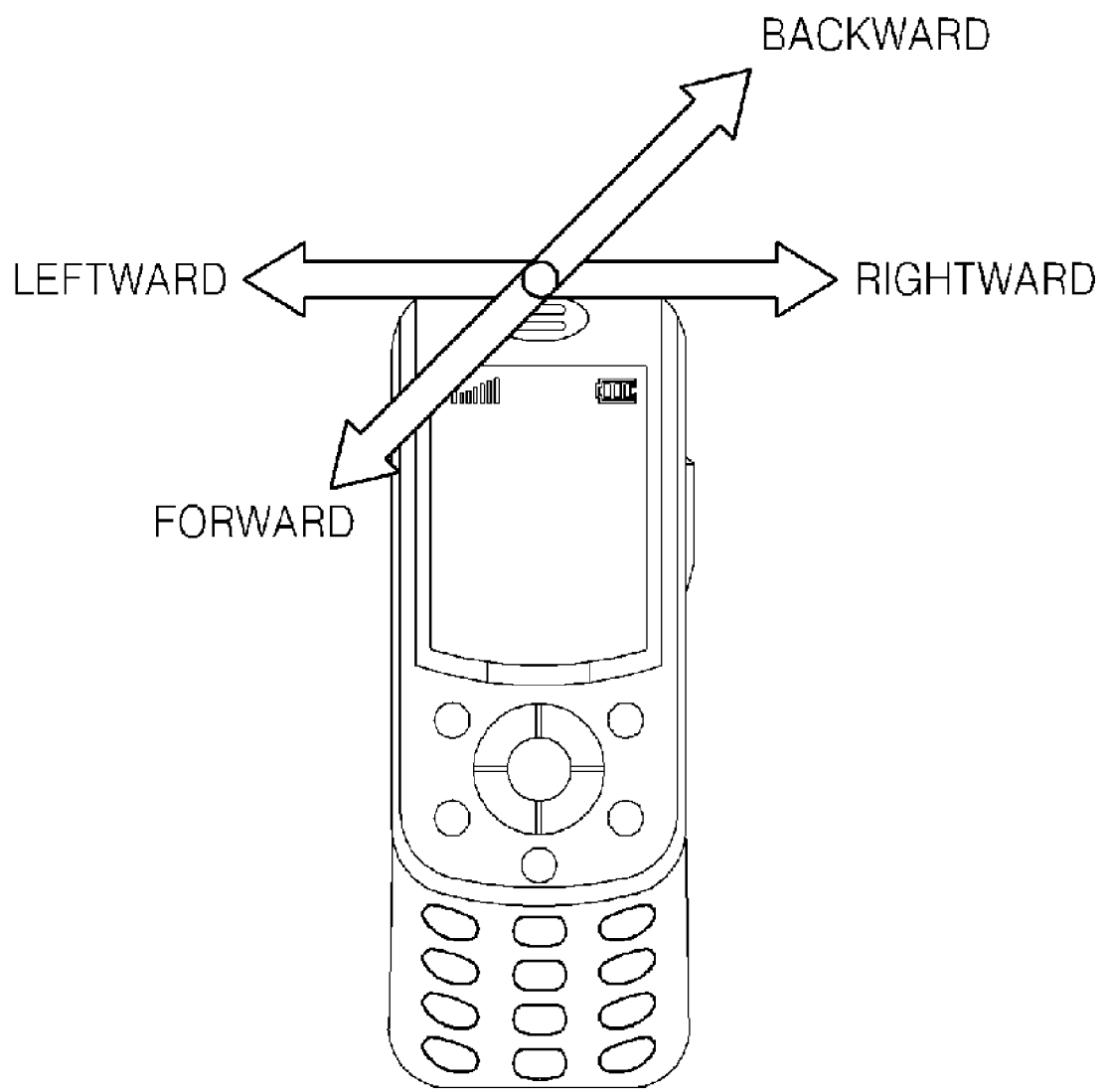

FIGS. 3A to 3C show directions of motion of a mobile terminal according to a user's behavior characteristics. Referring to FIGS. 3A to 3C, a user generally moves the mobile terminal in different directions when the user receives an audio call and a video call. For example, as shown in FIG. 3C, the user moves the mobile terminal "leftward" (if the user is left handed) or "rightward" (if the user is right handed) when the user receives an audio call, and moves the mobile terminal "forward" or "backward" based on habits of the user when the user receives a video call. As described above, the audio call mode and the video call mode may be automatically set by detecting the motion of the mobile terminal using the motion sensor when there is an incoming call event.

Referring back to FIG. 2, if a leftward or a rightward motion of the mobile terminal is detected in operation 220, the telephony mode is set to an audio call mode in operation 225. In contrast, if a forward or a backward motion of the mobile terminal is detected in operation 230, the telephony mode is set to a video call mode in operation 235. Meanwhile, if there is no motion of the mobile terminal, the telephony mode is set to a default call mode in operation 240. Then, the mobile terminal operates in the set call mode in operation 245. Though the illustrated embodiment in FIG. 2 sets the audio call mode according to a leftward or a rightward motion, and the video call mode according to a forward or a backward motion, it is understood that aspects of the present invention are not limited thereto. For example, according to other aspects, the audio call mode may be set according to a forward and/or backward motion, a circular motion, etc., and the video call mode may be set according to a leftward and/or rightward motion, a circular motion, etc.

Figure 4:
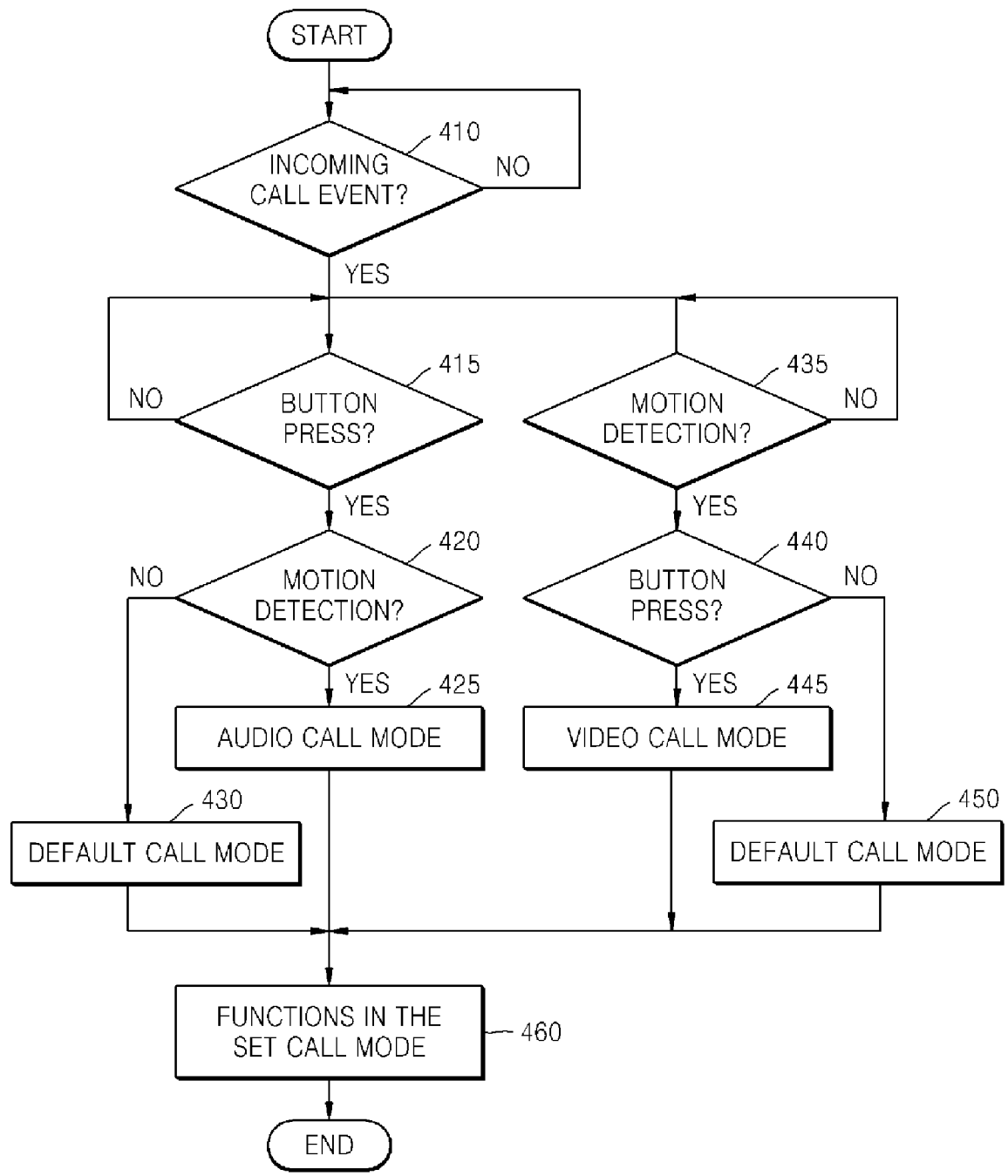
FIG. 4 is a flowchart illustrating a method of setting a telephony mode of a mobile terminal according to another embodiment of the present invention.

FIG. 4 is a flowchart illustrating a method of setting a telephony mode of a mobile terminal according to another embodiment of the present invention. Referring to FIG. 4, it is checked whether there is an incoming call event in operation 410. If there is an incoming call event (operation 410), a motion of a mobile terminal and a user's act to initiate the call are detected. In this regard, the user's act to initiate the call may be a press of a dial button, a slide open, a flip open, etc.

Generally, when a user wants to receive an incoming call in an audio call mode, the user presses a dial button, and then moves a mobile terminal near the user's ear. When the user wants to receive an incoming call in a video call mode, the user moves the mobile terminal in front of the user's face, and then presses the dial button. That is, the order between the user's act of moving the mobile terminal and the act of pressing the dial button is different according to whether the incoming call is an audio call or a video call. Thus, if the press of the dial button is detected in operation 415 and thereafter motion of the mobile terminal is detected in operation 420, the telephony mode is set to the audio call mode in operation 425. Meanwhile, if there is no motion of the mobile terminal, the telephony mode is set to a default call mode in operation 430. Furthermore, if the motion of the mobile terminal is detected in operation 435 and the press of the dial button is detected thereafter in operation 440, the telephony mode is set to the video call mode in operation 445. Meanwhile, if there is no motion of the mobile terminal, the telephony mode is set to a default call mode in operation 450. Accordingly, the mobile terminal operates in the set call mode in operation 460.

In conclusion, by detecting an order between the stop of motion of the mobile terminal and the press of the dial button, the telephony mode is set to a video call mode if the stop of motion of the mobile terminal is detected before the press of the dial button is detected, and the telephony mode is set to an audio call mode if the press of the dial button is detected before the stop of motion of the mobile terminal is detected.

Figure 5:
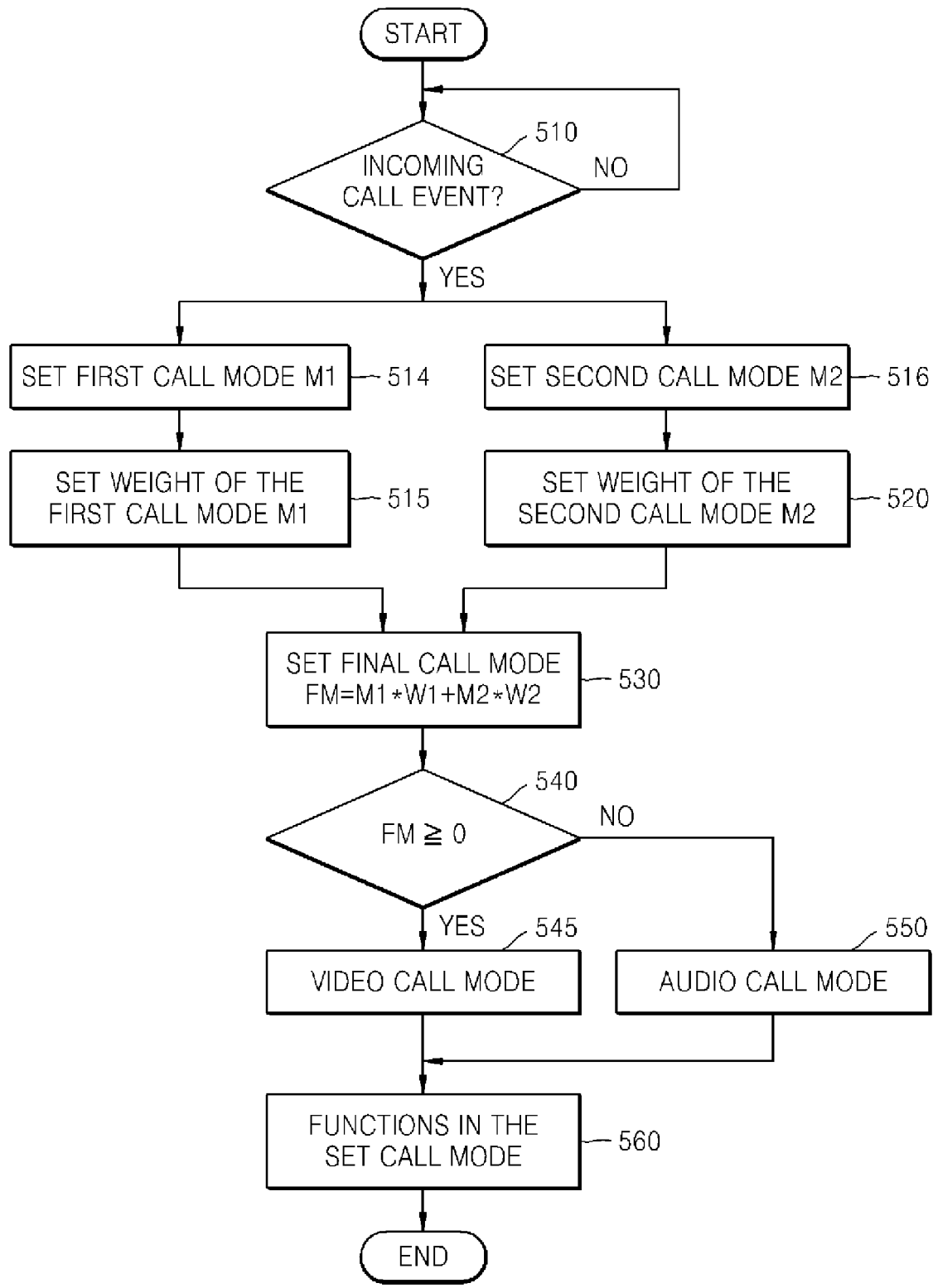
FIG. 5 is a flowchart illustrating a method of setting a telephony mode of a mobile terminal according to another embodiment of the present invention.

FIG. 5 is a flowchart illustrating a method of setting a telephony mode of a mobile terminal according to another embodiment of the present invention. Specifically, in the embodiment illustrated in FIG. 5, in order to increase accuracy of the telephony mode, a final telephony mode is set by combining a call mode using the motion of the mobile terminal (M1) with a call mode using motion of the mobile terminal and a user's act of pressing a dial button (M2).

Referring to FIG. 5, an incoming call event is checked in operation 510. Then, a first audio and/or video call mode M1 is set according to a direction of motion of the mobile terminal in operation 514, and a second audio and/or video call mode M2 is set according to a motion of the mobile terminal and the user's act to initiate the call in operation 516. Weights of the first call mode M1 and the second call mode M2 are set in operations 515 and 520. For example, a weight W1 of the first call mode M1 and a weight W2 of the second call mode M2 are calculated using equations:

$$W1=w, \text{ where } 0 \leq w \leq 1, \text{ and}$$

$$W2=1-W1.$$

Here, w may adaptively vary according to a ratio of a user's ordinary audio and/or video calls. In addition, w may be adaptively set according to an accuracy of the first call mode M1 and the second call mode M2. For example, when the mobile terminal automatically sets the telephony mode to a video call mode even though the user wants an audio call mode, the user will convert the video call mode of the mobile terminal to the audio call mode. Thus, accuracy of each of the first call mode M1 and the second call mode M2 may be calculated based on the user's behavior. According to the accuracy, a higher weight may be applied to a more accurate call mode between the first call mode and the second call mode.

Then, a final call mode FM is set by respectively multiplying the weights W1 and W2 by the first call mode M1 and the second mode M2 in operation 530. For example, $$M1=\{A|V\}, \text{ where } A(\text{audio})=-1, V(\text{video})=1$$

$$M2=\{A|V\}, \text{ where } A(\text{audio})=-1, V(\text{video})=1$$

$$FM=M1 \times W1 + M2 \times W2$$

Accordingly, if the final call mode FM is equal to or greater than "0" according to the equations above, the telephony mode is set to the video call mode in operation 545, and if the FM is less than "0", the telephony mode is set to the audio call mode in operation 550. The mobile terminal operates in the set call mode in operation 560.

According to another embodiment of the present invention, in the case where the user is using an audio operation of the mobile terminal (for example, listening to music) or using a video operation of the mobile terminal (for example, watching digital multimedia broadcasting (DMB)), the telephony mode may be set based on the current mode of the mobile terminal. For example, the telephony mode is set to the audio call mode if music is being played in the mobile terminal when an incoming call arrives, and the telephony mode is set to the video mode if DMB is being played in the mobile terminal when an incoming call arrives.

Furthermore, aspects of the present invention may be implemented in a recording medium as one or more computer-readable codes. A computer-readable recording medium includes all types of recording devices in which data which can be read by a computer system is stored. Examples of the computer-readable recording medium are ROM, RAM, CD-ROM, magnetic tape, hard disc, floppy disc, flash memory, and optical data storage device. In addition, the computer-readable recording medium may be distributed to computer systems connected via a network and be stored and executed as a computer-readable code using a distributed processing method.

According to the present invention, a convenient user interface can be provided by allowing a telephony mode to be set to an audio call mode or a video call mode based on motion of the mobile terminal and a user's behavior characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of setting a telephony mode of a mobile terminal, the method comprising:
   detecting, using one or more sensors, a direction of motion of the mobile terminal during an incoming call event; and
   setting the telephony mode to an audio call mode or a video call mode according to the detected direction of the motion,
   wherein the setting of the telephony mode further comprises:
   setting the telephony mode to the video call mode if a video operation of the mobile terminal is being performed when the incoming call event initiates;
   setting the telephony mode to the audio call mode if a non-video audio operation of the mobile terminal is being performed when the incoming call event initiates;
   setting the telephony mode to the video call mode if a first direction motion of the mobile terminal is detected and neither the video operation or the audio operation is being performed when the incoming call event initiates; and
   setting the telephony mode to the audio call mode if a second direction motion, different from the first direction motion, of the mobile terminal is detected and neither the video operation or the audio operation is being performed when the incoming call event initiates.

2. The method as claimed in claim 1, wherein the detecting of the direction of motion of the mobile terminal comprises measuring an acceleration of the mobile terminal when the motion of the mobile terminal is stopped.

3. The method as claimed in claim 1, wherein the setting of the telephony mode comprises:
   setting the telephony mode to the audio call mode if a leftward and/or a rightward motion of the mobile terminal is detected; and
   setting the telephony mode to the video call mode if a forward and/or a backward motion of the mobile terminal is detected.

4. The method as claimed in claim 1, further comprising setting the telephony mode to a default call mode if there is no detected motion of the mobile terminal.

5. The method as claimed in claim 1, wherein the setting of the telephony mode comprises:
   setting the telephony mode to the video call mode if a leftward and/or a rightward motion of the mobile terminal is detected; and
   setting the telephony mode to the audio call mode if a forward and/or a backward motion of the mobile terminal is detected.

6. A non-transitory computer readable recording medium encoded with the method of claim 1 and implemented by at least one computer.

* * * * *